United States Patent [19]

Escher et al.

[11] 4,375,075
[45] Feb. 22, 1983

[54] TANTALUM CAPACITORS WITH INTERNAL CURRENT-LIMITING MEANS

[75] Inventors: Balint Escher; Dominique Prince; René Romanet, all of Conflans Sainte Honorine, France

[73] Assignee: Lignes Telegraphiques et Telephoniques, Paris, France

[21] Appl. No.: 134,679

[22] Filed: Mar. 27, 1980

[30] Foreign Application Priority Data

Apr. 2, 1979 [FR] France .............................. 79 08275

[51] Int. Cl.³ ............................................. H01G 9/18
[52] U.S. Cl. ................................................. 361/433
[58] Field of Search ............... 361/433, 274, 275, 306, 361/307, 308; 337/290; 174/52 PE

[56] References Cited

U.S. PATENT DOCUMENTS

| | | | |
|---|---|---|---|
| 3,612,957 | 10/1971 | Steigerwald | 361/433 |
| 3,909,683 | 9/1975 | Kysely | 361/307 |
| 4,106,184 | 8/1978 | Fournier et al. | 361/433 |
| 4,121,277 | 10/1978 | Hilbert | 361/433 |
| 4,224,656 | 9/1980 | DeMatos et al. | 361/433 |
| 4,231,075 | 10/1980 | Morimoto et al. | 361/433 |

Primary Examiner—James W. Davie
Attorney, Agent, or Firm—Roland Plottel

[57] ABSTRACT

An improved solid-electrolyte tantalum capacitor for decreasing the danger of tantalum capacitors fires. An opening is provided in the external protection of the capacitor to allow the evacuation of the solder providing the contact between the cathode lead and the cathode when molten.

5 Claims, 5 Drawing Figures

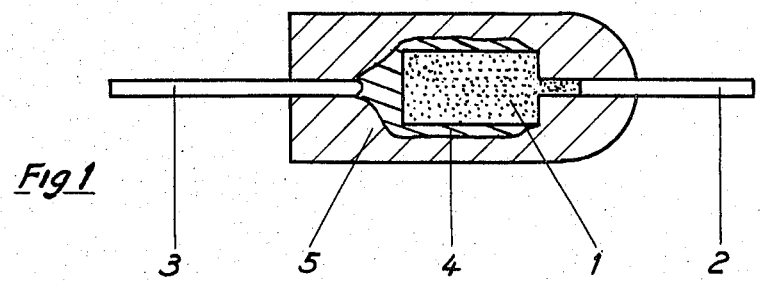
Fig 1 "PRIOR ART"
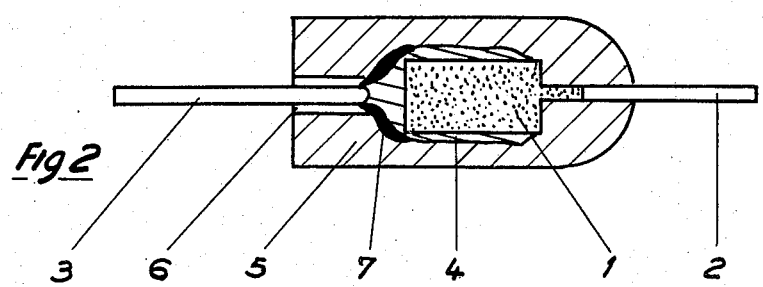
Fig 2
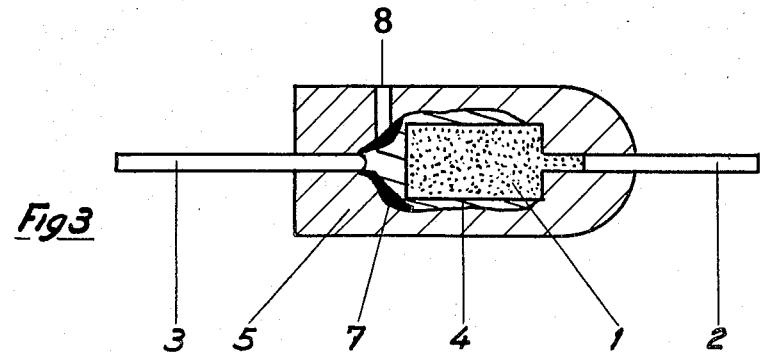
Fig 3

TANTALUM CAPACITORS WITH INTERNAL CURRENT-LIMITING MEANS

The purpose of the present invention is to eliminate the danger of spontaneous heating of the anode of a solid-electrolyte tantalum capacitor in the event of defective operation, heating which may eventually damage circuits in which the capacitor is connected.

It should be recalled that such a capacitor possesses a frittered tantalum powder anode whose oxidized surface constitutes the dielectric. Manganese dioxide impregnating the anode and in contact with conducting layers (generally of graphite and silver) constitutes the cathode. External contacts are attached to the frittered tantalum (anode) and cathode coating, the latter connection usually being soft-soldered. The capacitor is completed by a casing or coating to provide protection against mechanical shock and the environment, referred to as "protection" in the following text. Such capacitors have no internal current-limiting means. An incorrect connection or poor insulation has a chance of producing currents of sufficient value to raise the temperature of the anode, which spontaneously initiates a reaction raising the anode to white heat before destruction of the capacitor. This phenomenon occurs only after overheating at least one spot of the anode beyond a critical temperature. Under these conditions, not only is the capacitor destroyed, but neighbouring circuits can be severely damaged.

In spite of the rarity of this phenomenon, its seriousness justifies measures to be taken in order to render it practically impossible.

It has already been proposed - refer in particular to the French Pat. No. 2 318 491 filed on July 1, 1976 for "Dry Electrolytic Capacitor"—to insert between the cathode of a tantalum capacitor and its external connection a metallic fuse. The fuse consists of a pure metal or alloy link of given length placed between the cathode coating and the cathode external connection. The cross-section of this link is calculated to produce the required effect (protection of the coating material or protection of the anode, depending on the case). This structure does not appear to guarantee sufficient effectiveness in the case of moulded capacitors, since experience has shown that the electrical conductivity of commonly used soldered connections is little modified by their physical state, i.e. the contact is maintained even if the link is in liquid form. Interruption of the circuit requires evacuation of the solder. The progress achieved with materials and in moulding techniques are such that the protection withstands very high temperatures, which interferes with destruction of the capacitor by disconnection of the cathode contact wire, by preventing draining the solder. The danger of local heating igniting the anode tantalum and causing serious damage to equipment containing such capacitors is thus considerably increased.

The present invention overcomes this problems.

It is essentially characterized by the fact that the soldered cathode connection operates as a fuse, rendering the capacitor open-circuit in the event of overheating. This result is obtained by ensuring the evacuation of the soft solder, selected with a melting point lower than the said critical temperature, outside of the capacitor, ensuring that the capacitor becomes open-circuit. Evacuation of the liquid solder may be spontaneous (by the action of gravity) through a hole provided for this purpose in the protection of the capacitor. Alternatively, evacuation may be facilitated by the simultaneous formation and production of gas in the capacitor at the melting point of the solder, resulting in pressure expelling the liquid solder.

An important advantage of the invention resides in the fact that it can be applied to any type of capacitor without notable modification of the manufacturing process, the solder normally used for providing the electrical contact between the cathode and the cathode connection of this type of capacitor having an appropriate melting point, with the result that the cost of the protected capacitor is the same as that of the same unprotected capacitor. Similarly, the dimensions of the capacitor are not changed.

The present invention may be clearly understood from the following description and accompanying figures in which:

FIG. 1 represents a moulded capacitor with conventional axial leads,

FIG. 2 represents a first variant of the first type of capacitor in accordance with the invention, FIG. 3 represents a second variant of the same type of capacitor.

FIGS. 1, 2 and 3 correspond to a moulded tantalum capacitor with axial leads.

Figure 4:
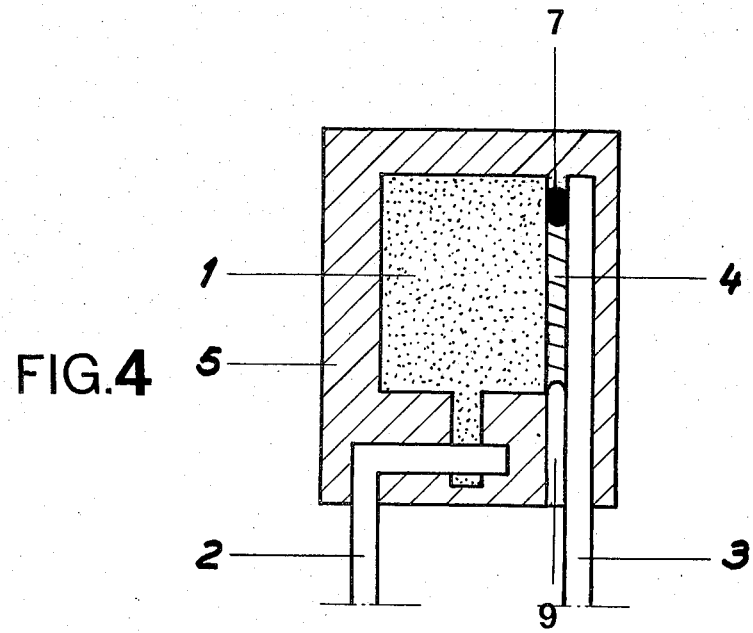
FIGS. 4 and 5 are two views of another type of capacitor in accordance with the invention.
Figure 5:
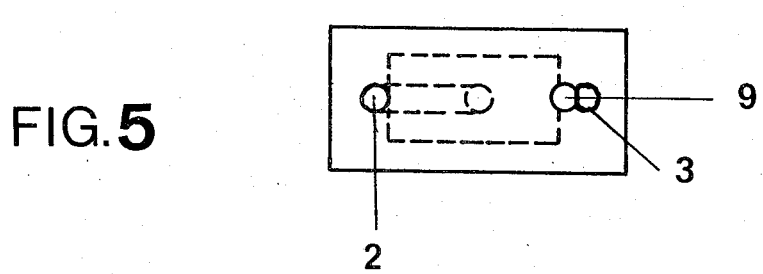

FIGS. 4 and 5 correspond to a moulded capacitor with type CTS 26 radial leads.

FIG. 1 schematically represents a sectional drawing of a capacitor with axial leads in accordance with former art. It possesses essentially a frittered anode 1, whose surface has a dielectric oxide coating impregnated with manganese dioxide. The manganese dioxide is covered with conducting layers constituting the cathode. The anode connection 2 is soldered to a tantalum wire attached to the anode structure 1. The capacitor is completed by a cathode lead 3 soldered to the cathode coating with tin-lead alloy 4 in the normal manner. The solder 4 covers practically the whole of the cathode surface. A coating 5 protects the capacitor and its two leads, both mechanically and chemically.

FIG. 2 shows the same type of capacitor produced in accordance with the invention. Elements 1, 2, 3 and 4 are thus identical in every way with those of FIG. 1. With regard to the coating 5, an annular passage 6 is provided around the cathode lead and through the thickness of the coating. In this manner, any liquid formed inside the capacitor flows along the lead 3 by capillarity. In order to facilitate even further the flow along lead 3, provision is made in accordance with a preferred variant of the invention to deposit on the surface of the solder 4 a coating 7 of material generating gas at a temperature close to and slightly higher than the melting point of the solder 4. This production of gas may result from the decomposition, evaporation or sublimation of the material constituting the coating 7. The material may be stable at the moulding temperature of the protection 5. As materials which can be used for producing the coating 7, mention may be made of so-called pyrogenic compounds, including commercially available azodicarbonamides and azodicarboxylates, marketed in particular by Bayer under the name "Pyrofor" and by Fisons under the name "Genitron". These products produce a large volume of nitrogen or carbon dioxide. The gas escapes through the passage 6, expelling the liquid solder. The pyrogenic compound is applied to the solder following installation of the connection 3 when the capacitors are mounted on a strip for moulding. This application is a quick operation and therefore low-cost before the moulding operation. It is proposed to apply the compound generally powdered and in suspension in a silicone varnish of a type supplied by Dow Corning, in a metacrylate varnish or in an epoxy resin which polymerizes during the moulding operation. The decomposition temperature of the compound is selected slightly higher than the solder melting point.

The reference numbers used in FIG. 3 illustrating the variant are the same as those used in the previous figures. It is seen that the capacitor coating in this variant has a radial passage 8 in place of the axial passage 6 of the variant in FIG. 2.

FIG. 4 is an axial sectional drawing of a type CTS 26 capacitor with axial leads and in accordance with the invention, whilst FIG. 5 is a bottom view of this same capacitor. The anode body 1 is seen, with its L-shaped external lead 2. The soldered connection 4 of the cathode lead 3 and the capacitor protection 5 (generally epoxy resin) are also seen. The liquid solder evacuation passage 9 is provided at the bottom of the protection next to the cathode lead, although this position is not imperative. The store 7 of gas-generating material facilitating the expulsion of the liquid solder is located above the solder 4.

The two examples described above relate to a moulded type of protection, but the invention is also applicable for capacitors in casings.

In order to demonstrate the effectiveness of the protection provided by the invention, comparative tests were made on identical capacitors moulded in thermosetting epoxy resin, with and without the feature in accordance with the invention. The application to the capacitors of a given voltage, considerably higher than their nominal working voltage, led to the following results. For the reference group of capacitors, one was rendered open-circuit, another took fire, 95% of the remaining capacitors split their mouldings, and the remaining 5% acted as short-circuits. The application of the same voltage to capacitors possessing the feature of the invention resulted in an open-circuit in less than two minutes for the whole group.

What is claimed is:

1. A solid-electrolyte tantalum capacitor comprising a frittered tantalum powder anode oxidized on the surface and impregnated and coated with manganese dioxide, conducting layers deposited on said dioxide, an anode lead in contact with said frittered tantalum, a soldered cathode lead soldered to said conducting layers and a protection provided by a casing or moulded coating, said protection being provided with an opening communicating to the outside of said casing close to the soldered cathode lead, for evacuating molten solder.

2. A capacitor in accordance with claim 1, further comprising, adjacent said soldered cathode lead, a layer of a material generating gas at a temperature slightly higher than the melting point of said soldered lead.

3. A capacitor in accordance with claim 1, wherein said opening is an annular passage around said cathode lead.

4. A capacitor in accordance with claim 2, wherein said protection is a moulded protection, and wherein said layer of a material generating gas comprises varnish containing an azodicarbonamide or azodicarboxylate compound which polymarizes at a temperature not more than that of the moulding temperature.

5. A capacitor according to claim 2 or 4, wherein said material generating said gas is deposited on said soldered cathode lead and is between said soldered cathode lead and said casing.

* * * * *